United States Patent [19]

Ranalli et al.

[11] 4,244,914
[45] Jan. 13, 1981

[54] PROCESS FOR PREPARING GAS-, VAPOR- AND ODOR-PROOF COUPLED AND COEXTRUDED MULTILAYER ARTICLES OF THERMOPLASTIC MATERIAL AND CLOSED-SURFACE BODIES COMPRISING THE SAME

[75] Inventors: Franco Ranalli, Milan, Italy; Leone Ortolani, 4, Via Palermo, Padva, Italy; Quinto Tisi, Ferrara, Italy

[73] Assignees: Montedison S.p.A., Milan; Leone Ortolani, Padua, both of Italy

[21] Appl. No.: 912,734

[22] Filed: Jun. 5, 1978

Related U.S. Application Data

[63] Continuation of Ser. No. 769,680, Feb. 17, 1977, abandoned.

[30] Foreign Application Priority Data

Feb. 18, 1976 [IT] Italy ............................... 20280 A/76
Feb. 18, 1976 [IT] Italy ............................... 20281 A/76

[51] Int. Cl.² ......................................... B29C 17/07
[52] U.S. Cl. .................................. 264/515; 264/519; 264/101; 264/173; 264/185; 428/35
[58] Field of Search .................... 264/173, 95, 98, 101, 264/185, 211, 510, 512, 514, 515, 519; 428/35

[56] References Cited

U.S. PATENT DOCUMENTS

| | | |
|---|---|---|
| 3,425,979 | 2/1969 | Monaghan et al. .................... 264/95 |
| 3,440,316 | 4/1969 | Miyake et al. ........................ 264/185 |
| 3,471,594 | 10/1969 | Kawamura et al. .................. 264/211 |
| 3,561,493 | 2/1971 | Maillard et al. ...................... 264/173 |
| 3,607,812 | 9/1971 | Takigawa et al. .................... 264/185 |
| 3,679,437 | 7/1972 | Oppenheimer et al. ............. 264/173 |
| 3,985,849 | 10/1976 | Notomi et al. ....................... 264/211 |

Primary Examiner—Jeffery R. Thurlow

[57] ABSTRACT

There is disclosed a new process for preparing coupled and coextruded multilayer articles (consisting of two or more layers) made of thermoplastic materials, and closed-surface bodies comprising the same.

The process comprises (a) feeding, to an extruder connected with a coextrusion head, a polyvinyl alcohol having a high degree of hydrolysis mixed with an aqueous mixture of plasticizing compounds and heated under pressure to bring it to the plastisol state;

(b) subjecting the plastisol polyvinyl alcohol to rapid decompression with simultaneous venting of the evolved vapors, before it enters the coextrusion head and while it is at a temperature at least equal to, and preferably higher than, the temperature of the coextrusion head;

(c) separately feeding at least one other thermoplastic polymer to the same coextrusion head;

(d) adjusting the temperature of the polymers, after contact thereof, so that the temperature of the polyvinyl alcohol is at least equal to, and preferably higher than, the temperature of the other coextruded polymer or polymers;

(e) adjusting the flow rate of the polymers so that the outflow linear velocities thereof are equal or differ no more than ±10%; and (f) molding the coextruded article leaving the coextrusion head into a manufactured article.

19 Claims, 5 Drawing Figures

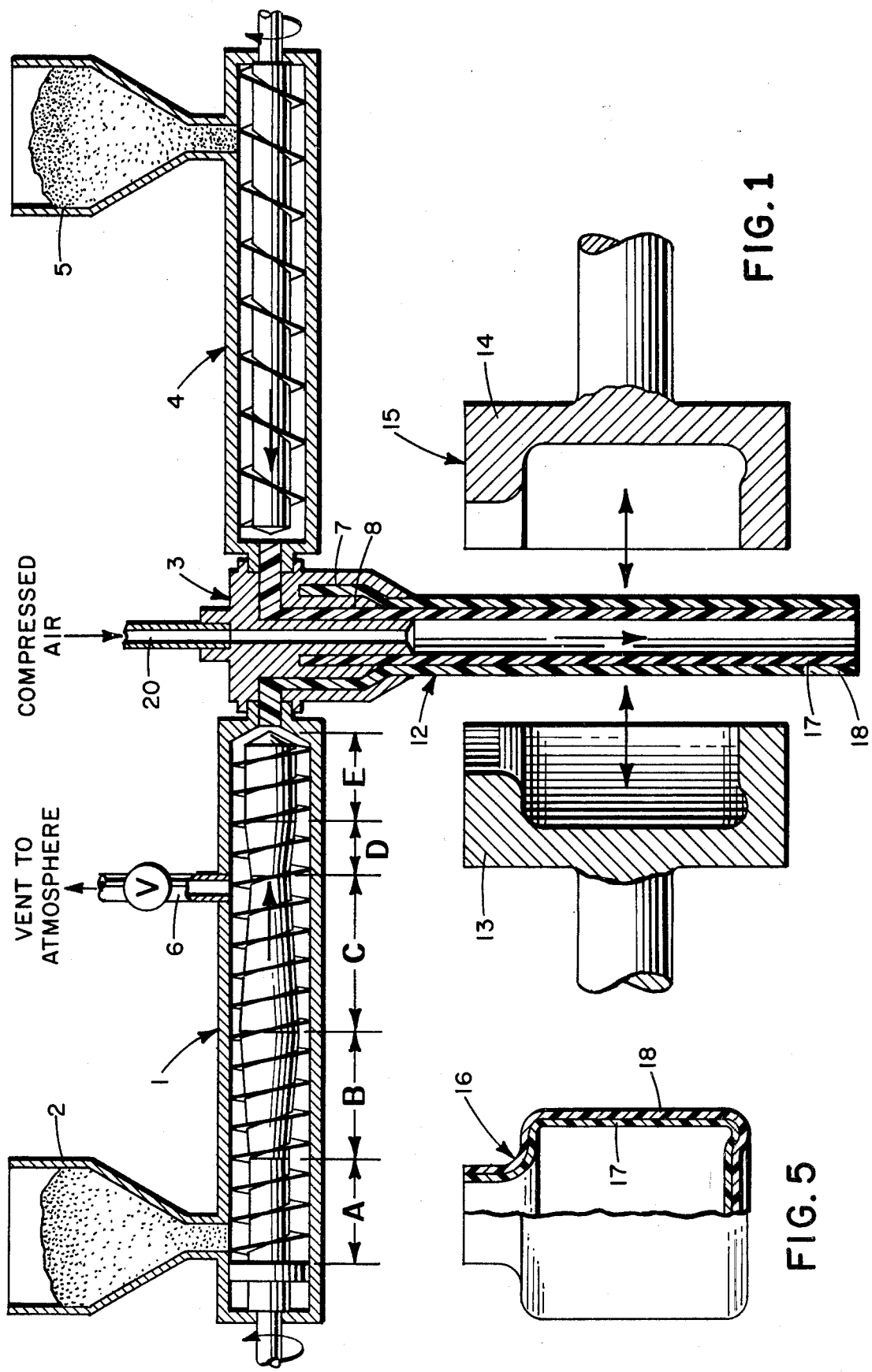

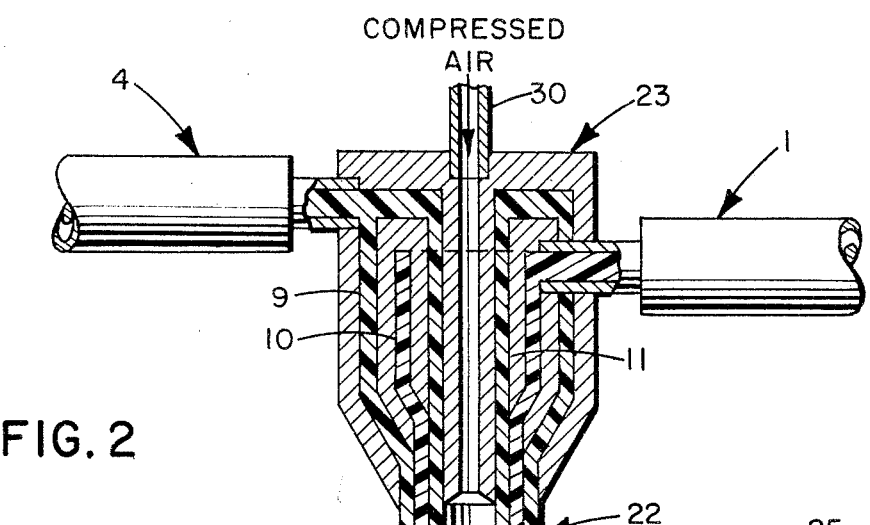
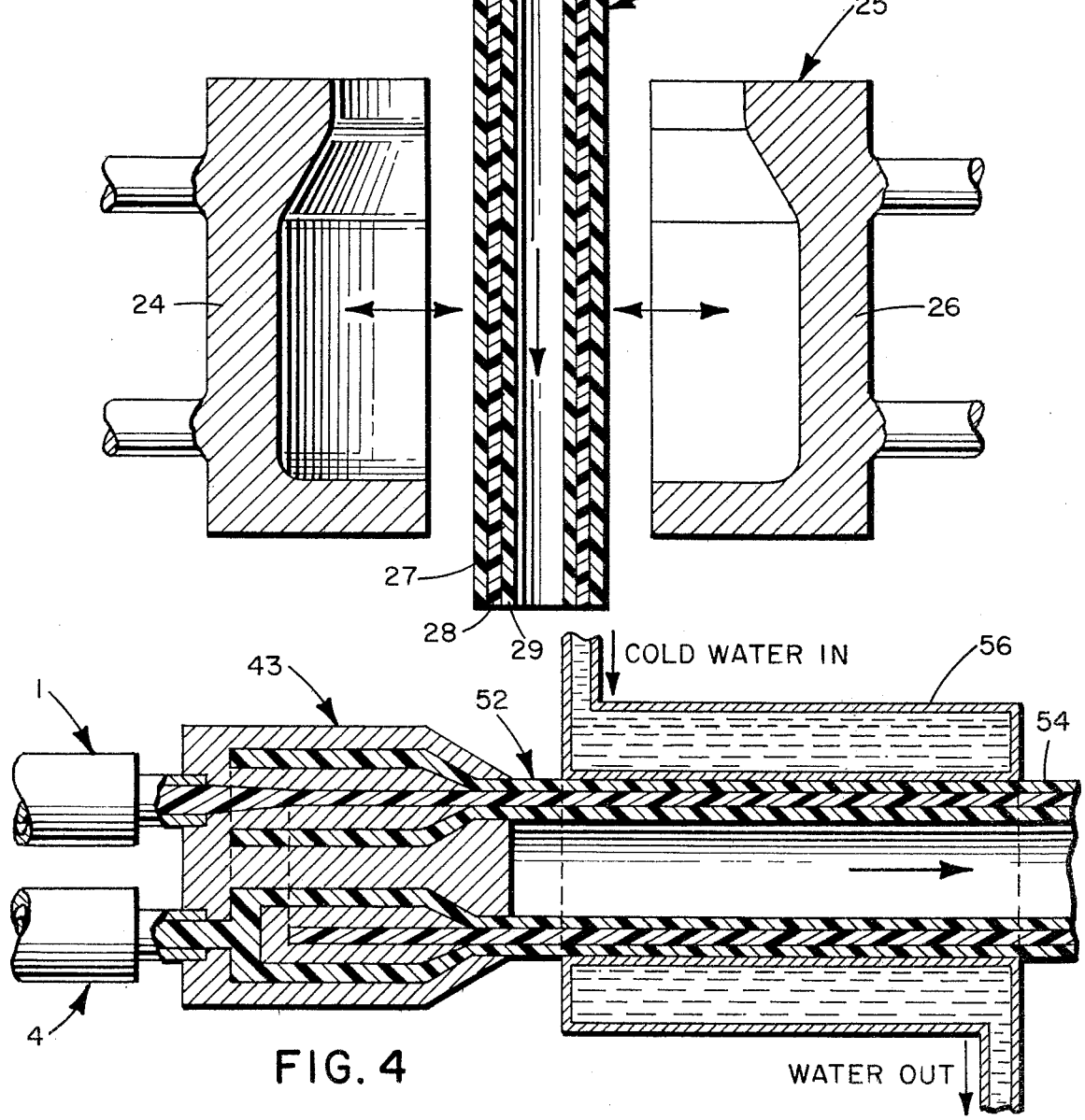

PROCESS FOR PREPARING GAS-, VAPOR- AND ODOR-PROOF COUPLED AND COEXTRUDED MULTILAYER ARTICLES OF THERMOPLASTIC MATERIAL AND CLOSED-SURFACE BODIES COMPRISING THE SAME

This is a continuation of application Ser. No. 769680, filed Feb. 17, 1977 now abandoned.

THE PRIOR ART

Most of the thermoplastic polymers available on the market which are generally employed in the preparation of articles as defined herein, have several drawbacks that render them not unconditionally suitable for all the uses for which shaped bodies, such as tubular films, blown or molded hollow bodies, tubes, containers, bottles, vessels and the like are intended.

Thus, for example, many thermoplastic polymers having excellent characteristics of processability and hot molding, exhibit a high permeability to gases and to water vapors, so that they cannot be used for packaging food or medicines, for manufacturing bottles for aerated drinks, or as inner pockets for pressurized, two-compartment containers, etc.

The vinylidene copolymers are sufficiently impermeable for some specific applications. However, the use of said copolymers is limited exclusively to flat films due to the difficulties met during the processing thereof to obtain thinwall bodies. Also, the vinylidene copolymers have certain drawbacks, such as low stretching characteristics, low modulus, low characteristics of hot weldability, low resistance, etc., that substantially limit their use.

Other polymers such as, for example, polyvinyl alcohol having a relatively high hydrolysis degree, are very highly impermeable to gases, vapors, and odors, but present serious drawbacks due both to their sensibility to water and to their very low processability.

In fact, as is known, the molding of articles made of polyvinyl alcohols, extruded at temperatures higher than 100° C. by the conventional processing techniques, exhibits the drawback of causing a more or less intense formation of vapor bubbles due to the rapid evaporation of the water used as plasticizer of the polymer. Furthermore, the vinyl alcohol polymers have the drawback of not retaining their excellent impermeability to oxygen in very wet conditions.

With a view to meeting all requirements, an attempt was made to produce multilayer articles, i.e., articles consisting of at least two layers, according to conventional methods, such as by immersion, spraying or coating.

The application of one or more coatings to a basic polymer remarkably improves the functionality of the composite containers or films prepared, as regards their resistance to permeability, to chemical agents, to water vapor, etc., since the advantages of one component can match the defects of the other, and vice-versa. Thus, for instance, a polyethylene container coated by immersion with polyvinylidene chloride exhibits a permeability to oxygen which is five times less than that of the uncoated container.

The coating process by immersion or spraying, however, is very expensive, requires both additional work and the use of such complex and expensive devices that advantages gained are voided by the high cost of carrying out the coating operation.

Furthermore, it is difficult to obtain high-quality products on an industrial scale, due to the general impossibility of obtaining a sufficiently high adhesion between the container and the coating to prevent exfoliation.

Moreover, when polyvinyl alcohol is employed as coating material, there is the problem of its processability.

THE PRESENT INVENTION

One object of this invention is to provide a new process for preparing multilayer articles, i.e., articles comprising two or more layers made of plastic material and which are gas-, vapor- and odor-proof, and resistant to water and chemical agents, and which process does not exhibit the disadvantages and drawbacks of the prior art processes.

Another object is to provide a process for preparing multilayer articles made of thermoplastic material in which at least one layer is made of polyvinyl alcohol uniformly spread over the articles to prevent defects that could impair the utility of the articles for the purposes for which they are intended.

Still another object is to provide closed-surface multilayer articles, e.g., articles comprising two or more layers made of thermoplastic materials and which are impermeable to gases, vapors and odors, resistant to water and chemical agents and which do not have the disadvantages and drawbacks of the prior art articles.

The term "articles" as used herein includes plates, sheets, films, blown or molded hollow bodies, pipes, containers, and the like.

The term "closed-surface articles", as used herein, includes tubular films, blown or molded hollow bodies, tubes, containers, bottles, vessels and the like.

The foregoing objects, and other objects as will appear, are achieved by the present invention which provides a process consisting of the following sequential steps:

(a) feeding an extruder connected with a coextrusion head with a polyvinyl alcohol at a high hydrolysis degree containing as plasticizer a water-containing mixture of plasticizing compounds and heated under pressure to bring it to the plastisol state;

(b) subjecting the plastisol polyvinyl alcohol of step (a) to rapid decompression under simultaneous venting of the evolved vapors, before said polymer enters the coextrusion head and while it is at a temperature at least equal to, and preferably higher than, that of the coextrusion head;

(c) separately feeding to the same coextrusion head at least one other thermoplastic polymer in the molten state;

(d) adjusting the temperature of the polymers when they are contacted with one another, so that the polyvinyl alcohol temperature is at least equal to, and preferably higher than, that of the other coextruded polymer or polymers, and (e) adjusting the flow velocity of the polymers so that their outflow linear velocities are equal or differ, at most, by ±10%.

The closed-surface articles, as defined above and obtained by the present process, consist of two or more coupled and coextruded layers of thermoplastic material, in which at least one layer is made of polyvinyl alcohol uniformly spread over the entire surface of the article.

In said closed-surface articles, the thickness of the polyvinyl alcohol layer may vary over a wide range of values and is generally comprised between 100 microns and a few millimeters. The thickness of the other layers depends on the resistance desired in the finished article which, in turn, depends on the use for which the finished article is intended.

The component responsible for the impermeability to gases, vapors and odors is generally polyvinyl alcohol, while the resistance to water and to chemical agent is usually imparted by the other coextruded polymer. In consequence, the number, order of the coupled and coextruded layers and type of thermoplastic polymer to be coextruded with the polyvinyl alcohol are selected and varied as a function of the uses for which the articles are intended, and the characteristics required.

Thus, for instance, when bottles or containers in general for aerated drinks are to be produced, the layers should be preferably at least three, and preferably polyolefin/polyvinyl alcohol/polyolefin; the polyolefin being preferred due to its known resistance to water and to chemical agents.

Conversely, if interior pockets for pressurized containers are to be produced, which have to keep the product conditioned in a sterilized environment and prevent as much as possible penetration into the pocket of the gas present in the hollow space between the pocket and rigid container, the layers should be preferably at least two, of which the inner one is preferably a polyolefin, while the outer one is polyvinyl alcohol.

The polyvinyl alcohol layer also may be arranged inside the container in case the material to be contained therein is anhydrous and consistent with the polyvinyl alcohol.

Any polyvinyl alcohol having a polymerization degree ranging from 600 to 1500 and a hydrolysis degree of at least 85 mol % can be used in practicing this invention. In particular, a polyvinyl alcohol having a polymerization degree higher than 900 is preferred in practice, since it provides a film having good mechanical resistance.

As the other polymer or polymers there can be used any thermoplastic polymer, such as polystyrene, polyvinyl chloride, foamed polystyrene, nylon 6, nylon 66, polyethylene terephthalate, chlorinated polyethylene, polyvinylidene chloride, polyvinyl acetate or a polyolefin obtained by polymerizing one or more ethylenically unsaturated monomers having the general formula:

$$CH_2=CH-R$$

wherein R may be hydrogen or a hydrocarbon radical containing 1 to 20 carbon atoms, either with one another or with other copolymerizable monomers such as, for example, vinyl acetate, vinyl or vinylidene chloride or bromide, or acrylonitrile, the comonomer being present in amounts ranging from 0.05 to 20% by weight.

Among the useful thermoplastic polymers, low density polyethylene (i.e., polyethylene having a density comprised between 0.914 and 0.930); high density polyethylene (i.e., polyethylene having a density higher than 0.930 and up to 0.970); and polypropylene having a high isotactic index and prepared by stereospecific polymerization of propylene, are preferred, due to their high impermeability to water vapor and resistance to chemical agents.

Our tests have proved that the coextrusion of polyvinyl alcohol with at least one other thermoplastic polymer in order to obtain multilayer coextruded articles, and preferably closed-surface articles, is possible in excellent processability conditions and with formation of a homogeneous polyvinyl alcohol layer all over the surface of the article, only when the following operating conditions are observed:

raising the polyvinyl alcohol temperature, before the polymer enters the coextrusion head, to a value at least equal to that reached by the polymer in the coextrusion head;

venting the vapors evolved while polyvinyl alcohol is at such relatively high temperature and under decompression conditions;

maintaining the temperture of the polyvinyl alcohol in the coextrusion head at a value at least equal to, and preferably higher than, that of the other coextruded polymer or polymers; and coextruding all of the molten polymers at the same linear velocity or at a velocity difference not exceeding ±10%.

In the presently preferred embodiment of the invention, the molten mass, especially that of polyvinyl alcohol, is kept in continuous movement preventing, as much as possible, any stagnations either in the extruder or in the coextrusion head. Furthermore, the polyvinyl alcohol preferably has a fluidity and flowing velocity such as to reduce to a minimum the counter-pressure necessary to obtain, at the outlet, a homogeneous product.

Moreover, when transforming the coextruded pipe (parison) into a manufactured article, in particular for the two-layer products, the parison molding should preferably occur as quickly as possible and in any case in a time-period not exceeding five minutes.

The two- or multilayer parison coming from the coextrusion head is subjected to various treatments, depending on the final use for which it is intended. Thus, for example, in the production of films, the parison coming from the coextrusion head is cooled externally and air is blown into the bell at a pressure sufficient to sustain and to stretch the coextruded material, according to the known technologies of the art.

Conversely, in manufacturing containers such as bottles, pockets and the like, the parison coming from the coextrusion head is clamped between the sections of a die and air under pressure is blown into the inside of the pipe section contained in said die, in order to cause it to assume the inside shape of the hollow of the die.

Moreover, in producing pipes, the parison coming from the coextrusion head is calibrated and cooled according to the known technologies.

The polyvinyl alcohol, additioned with the water-containing mixture of plasticizers, is brought to the plastisol state by heating to a temperature higher than 150° C. while it is in the extruder and under pressure.

The pressure employed can vary as a function of the operating conditions and of the amount of plasticizer added; in general it is higher than 30 atm.

The polyvinyl alcohol mass, once brought to the plastisol state, is heated to a temperature at least equal to that of the coextrusion head and is simultaneously subjected to a rapid decompression and venting, so as to liberate, by flash, the excess of water vapors or of other volatile components, if any, contained in the polymer, with respect to the thermodynamic equilibrium conditions corresponding to the mixture at such temperature.

To facilitate the elimination of the vapors and to prevent them from condensing, it is preferable to suck off the vapors liberated during the venting by means of an exhauster.

To feed the polyvinyl alcohol to the extrusion head, it is preferable to use an extruder having a high length-/diameter ratio, such as, e.g., extruders having a length-/diameter ratio higher than 25. Besides, the structure of the coextrusion head should be preferably such as to prevent possible mixing of the plastic materials flowing into it.

In particular, in practicing the present process, the polyvinyl alcohol flow is preferably kept constant, rapid and regular in order to avoid both stagnation and degradation of the polymer.

As already mentioned, one of the essential conditions for the coextrusion of polyvinyl alcohol with at least one other thermoplastic polymer is that the temperature of the plastisol mass of the polyvinyl alcohol be at least equal to, and preferably higher than, the temperature of the other coextruded polymer or polymers, at the time of contact between them in the coextrusion head. In practice, however, such temperature difference should preferably not exceed 70° C.

In order to impart sufficient fluidity to the polyvinyl alcohol in the extrusion-by-melting conditions, it is plasticized with a mixture consisting of water and a polyvalent alcohol in such amount that the sum of the water plus polyvalent alcohol is not higher than 50% by weight with respect to the polyvinyl alcohol.

Preferred compositions of the plasticizing mixture are those containing from 7 to 20% by weight of water and from 8 to 25% by weight of a polyvalent alcohol, with respect to the polyvinyl alcohol.

Some examples of polyvalent alcohols to be advantageously employed as plasticizers of the polyvinyl alcohol are: ethylene glycol, triethylene glycol, polyethylene glycol, glycerine, trimethylene propane, etc. It is preferable, furthermore, to add to the polyvinyl alcohol 1 to 3 parts percent of a stearate of a metal belonging to the first or second group of the Mendelyeev Periodic Table, in order to impart to the polyvinyl alcohol a higher thermal stability. The composition to be coextruded, based on polyvinyl alcohol, can comprise, if desired or necessary, lubricants, pigments, or other known adjuvants.

In order to better explain the present process, reference is made to the accompanying drawing representing, without limitation thereto, some preferred embodiments of the invention.

In the drawing,

FIG. 1 is a longitudinal sectional view of a coextrusion device consisting of two extruders connected with a coextrusion head, and in which the two-layer tubular laminate is collected by an open die;

FIG. 2 is a sectional view of a coextrusion device similar to that of FIG. 1, in which one of the extruders feeds simultaneously the innermost layer and the outermost layer of a three-layer laminate and in which the three-layer tubular extrusion is collected by an open die;

FIG. 4 is a schematic view of a device like that of FIG. 1, in which one of the extruders contemporaneously feeds the internal and external layers of a three-layer laminated tube which is shaped by a calibrating and cooling device into a tube; and FIG. 5 is an elevational view, partially in section, of the container obtained by means of the device of FIG. 1.

Figure 3:
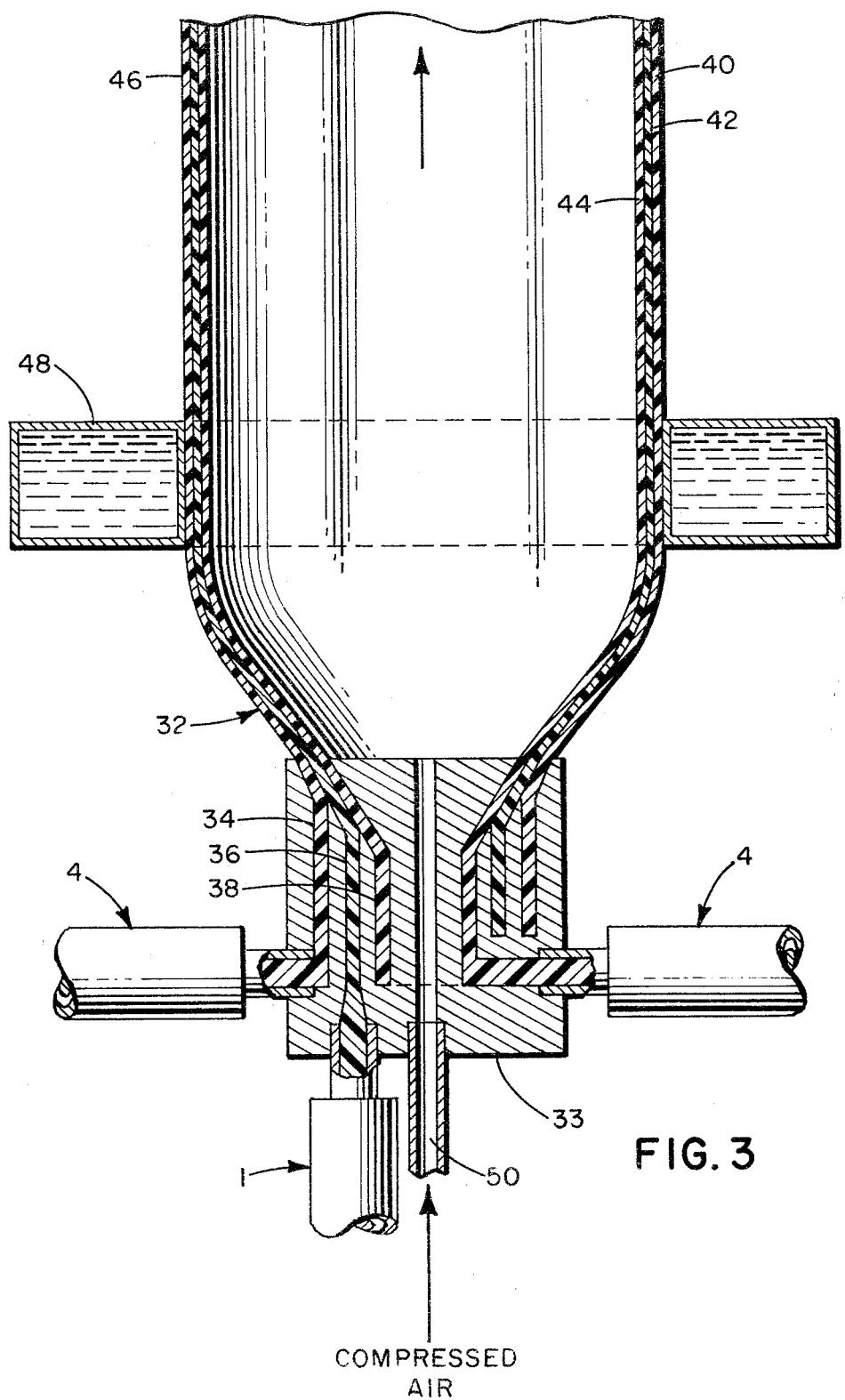
FIG. 3 is a sectional view of a coextrusion device like that of FIG. 1, comprising three extruders all of which are connected with a coextrusion head and in which the three-layer extruded tube is connected to a blowing device for making tubular films.

Referring to the figures of the drawing, the polyvinyl alcohol, additioned with water, a polyvalent alcohol and optionally other lubricants and stabilizers, is introduced through hopper 2 into extruder 1, from which it is fed to coextrusion head 3.

Another thermoplastic polymer to be coextruded with the polyvinyl alcohol is fed to the same coextrusion head 3 by extruder 4, equipped with hopper 5.

Extruder 1 for polyvinyl alcohol has a high length-/diameter ratio and the screw is shaped to divide the extruder into five zones, each zone being maintained at a different controlled temperature which increases until reaching the maximum temperature in the third zone corresponding to the decompression zone. The zones of extruder 1 are the following:

polymer feeding zone A, maintained at 140°–200° C.;
compression zone B, maintained at 150°–210° C., and in which the polyvinyl alcohol is plasticized;
decompression zone C, maintained at 170°–220° C.;
recompression zone D, maintained at 170°–215° C.; and
proportioning zone E, maintained at 170°–205° C.

Extruder 1 is also equipped, in proximity to the decompression zone C, with a vent pipe 6, in which, by pressure drop, all the vapors evolved from the plasticized polymer are eliminated. Such elimination of the vapors can be facilitated by arranging an exhauster in proximity to vent 6.

The polyvinyl alcohol, in the plastisol state and de-aerated, is fed to coextrusion head 3, which is kept at a temperature lower than that of decompression zone C and preferably at a temperature comprised between 160° and 200° C.

The other thermoplastic polymer, in the form of granules or in powder form, and which successively melts and plasticizes by heating to a temperature ranging from 120° C. to 200° C., is fed by extruder 4. As already stated herein, the temperature of the other thermoplastic polymer, or polymers, must be lower than that of the polyvinyl alcohol at the time the two polymers come into contact with each other in the coextrusion head.

In FIG. 1, both extruders 1 and 4 are connected with a coextrusion head 3 having two concentric annular orifices 7 and 8, the polyvinyl alcohol being extruded through outer orifice 7 and the other polymer through inner orifice 8.

A laminated tube 12 is extruded from the bottom of head 3. The tube 12 is formed by inner and outer layers 17 and 18, respectively. When tube 12 has reached a given or sufficient length, the die 15 is closed around it and compressed air is blown into the tube through conduit 20 in head 3, thus pressing the plastic laminate into the die form.

In FIG. 2, the two extruders 1 and 4 are connected with a coextrusion head 23 having three concentric orifices 9, 10 and 11, the polyvinyl alcohol being extruded through central orifice 10 and the other polymer through outer orifice 9 and inner orifice 11.

The laminated tube 22 is formed of three layers of plastic, 27, 28 and 29, respectively. The tube 22 is expanded into the closed die 25 by compressed air introduced through conduit 30 in head 23. The extruded laminated tube 22 may be formed into a container by die 25 composed of parts 24 and 26.

In FIG. 3, use is made of coextrusion head 33 having three concentric conical annular orifices 34, 36 and 38′ as in FIG. 2, but each orifice is fed by a different extruder. The extruders, therefore, are three, of which the extruders feeding outer orifice 34′ and inner orifice 38′ are similar to extruder 4, while the extruder feeding the intermediate or central ofifice 10′ is similar to extruder 1.

The orifices 34, 36, 38 diverge outwardly and upwardly from the center of extrusion head 33 and thus a larger laminated tube 32 is formed than is the case with the extrusion heads 3 and 23. The tube 32 is formed of laminated layers 40, 42 and 44.

FIG. 4 shows a coextrusion head like that of FIG. 2, with the exception that the two extruders 1 and 4 are arranged parallel to the extrusion axis.

The tubular extrusion 12 coming out from coextrusion head 3 can be clamped between sections 13 and 14 of a die 15, and kept, by conventional means, below coextrusion head 3 and axially aligned with the outlet hole of said head, as illustrated in FIGS. 1 and 2. As an alternative, an extruded tube 32 can be transformed into a tubular film by blowing compressed air into the tube 32 to form a large cylindrical tube 46. The tubular film is shaped and cooled by means of a cooling ring 48, according to known techniques (see FIG. 3). The compressed air is introduced through conduit 50 in extrusion head 33.

Obviously, using a coextrusion head having rectilinear orifices it is possible to obtain flat composite multilayer plates, sheets or films consisting of two or more layers.

Finally, FIG. 4 shows how to produce a pipe 54 by shaping and simultaneous cooling of the tube 52 carried out by a known water-cooled device 56, which surrounds the extruded tube 52.

The following examples are given to illustrate the invention in more detail and are not intended to be limiting.

EXAMPLE 1

100 parts of polyvinyl alcohol having a polymerization degree of about 1000 and a hydrolysis degree of 88–89 moles percent were added with 20 parts by weight of water, 20 parts by weight of glycerine and 1 part by weight of zinc stearate. The mixture was fed to a screw extruder connected with a coextrusion head having two concentric holes and a length/diameter ratio of 28.

The screw was shaped in such manner, as to divide the extruder into five zones, namely:

A a feeding zone, in which the depth of thread was kept constant;
B a compression zone, in wich the compression ratio was about 3:1;
C a decompression zone, in which the decompression ratio was about 4:1;
D a recompression zone, in which the compression ratio was about 2:1; and
E a feeding zone, in which the depth of thread was kept constant.

The extruder was heated to maintain the following temperatures in each of the zones:
zone A: 190° C.
zone B: 195° C.
zone C: 205° C.
zone D: 200° C.
zone E: 190° C.

In proximity to zone C, the polymer/plasticizer mixture was subjected to suction through a vent arranged in the extruder jacket. Said suction can be facilitated by arranging a vacuum intake in the upper part of the vent.

The polyvinyl alcohol in the plastisol state was fed by the extruder to the outer orifice of the coextrusion head kept at 180° C. The inner orifice of said coextrusion head was connected with another extruder of conventional type, that fed the low density, molten polyethylene kept at a temperature of 150° C.

The parison coming from the coextrusion head was conveyed between the two sections of a blowing die and transformed into a hollow container according to known techniques.

The resulting hollow container weighed about 16 grams, had a volume of 110 cc and a thickness of the outside layer of about 400 microns and of the inside layer of about 600 microns.

The permeabilities to oxygen, nitrogen, carbon dioxide and fluorinated or chlorinated gases of the hollow container so obtained were practically nil at pressures from 1 atmosphere to the bursting pressure.

EXAMPLE 2

100 parts of polyvinyl alcohol having a polymerization degree of 1100 and a hydrolysis degree of 88–89 moles percent were added with 10 parts by weight of water and 10 parts by weight of glycerine. The mixture was transformed into the plastisol state as per Example 1 and, after deaeration, was fed to the middle or central orifice of a coextrusion head, kept at 170° C. and having three orifices. The other two orifices, inner and outer, were connected with one extruder only, that was fed with low density polyethylene heated to 140° C.

The three-layer coextruded parison so obtained was conveyed between the two sections of a blowing die and transformed into a bottle according to known techniques.

The permeabilities to oxygen, nitrogen and carbon dioxide of the bottle so obtained resulted to be practically nil at a pressure of 4 atmospheres.

What we claim is:

1. A process for preparing multilayer articles consisting of at least two layers made of different thermoplastic materials and characterized in being impermeable to gases, vapors and odors, by coextruding at least two different thermoplastic polymers at least one of which is polyvinyl alcohol having a polymerization degree of from 600 to 1,500 and a hydrolysis degree of at least 85% by mols, and successively molding the coextruded article, said process comprising the following steps:

(a) feeding to an extruder connected with a coextrusion head a polyvinyl alcohol having the stated hydrolysis degree pre-mixed with an aqueous mixture of plasticizing compounds in an amount not higher than 50% by weight with respect to the polyvinyl alcohol and heating the polyvinyl alcohol/aqueous plasticizing compounds mixture in the extruder under pressure to bring it to the plastisol state;

(b) raising the temperature of the polyvinyl alcohol/aqueous plasticizing compounds mixture, before the mixture enters the coextrusion head, to the temperature at least equal to that reached by the mixture in the coextrusion head, and subjecting the mixture, while it is at such relatively high temperature, to rapid decompression with simultaneous venting of the evolved vapors;

(c) separately feeding at least one other thermoplastic polymer in the molten state and selected from the group consisting of polystyrene, polyvinyl chloride, foamed polystyrene, nylon 6, nylon 66, polyethylene terephthalate, chlorinated polyethylene, polyvinylidene chloride, polyvinyl acetate, polyolefins obtained by polymerizing ethylenically unsaturated monomers of the formula $CH_2=CHR$, in which R is hydrogen or a hydrocarbon radical containing 1 to 20 C atoms either alone or with one another, and polymers obtained by polymerizing said monomers $CH_2=CHR$ with other comonomers copolymerizable therewith and containing from 0.05 to 20% by weight of comonomer, to the same coextrusion head;

(d) adjusting the temperature of the polymers when they are in contact so that the temperature of the polyvinyl alcohol is at least equal to the temperature of the other coextruded polymer or polymers;

(e) adjusting the flow rate of the polymers so that the outflow linear velocities are equal or differ no more than ±10%; and (f) coextruding the polyvinyl alcohol/aqueous mixture of plasticizing compounds and the other thermoplastic polymer and molding the article comprising the coextruded and bonded layers leaving the coextrusion head to obtain a shaped, manufactured article.

2. The process of claim 1, in which the polyvinyl alcohol has a polymerization degree higher than 900.

3. The process of claim 1, in which the polyvinyl alcohol is plasticized with a mixture of water with a polyvalent alcohol.

4. The process of claim 3, in which the plasticizing mixture contains from 7 to 20% by weight of water and from 8 to 25% weight of a polyvalent alcohol.

5. The process of claim 3, in which the polyvalent alcohol is glycerin.

6. The process of claim 1, in which the polyvinyl alcohol is stabilized with 1 to 3 parts percent of a stearate of a metal of the first or second group of the Mendelyeev Periodic Table.

7. The process of claim 1, in which the extruder by which the polyvinyl alcohol is fed to the coextrusion head has a high length/diameter ratio and in said extruder the polyvinyl alcohol is brought to the plastisol state by heating to a temperature higher than 150° C.

8. The process of claim 7, in which the length/diameter ratio of the extruder is higher than 25.

9. The process of claim 1, in which the pressure to which the polyvinyl alcohol is subjected in the extruder is higher than 30 atmospheres.

10. The process of claim 1, in which the screw of the extruder for the polyvinyl alcohol is shaped so as to divide the extruder into the folloiwng five zones maintained at different temperatures, the temperature increasing until the third zone:

feeding zone of the polymer: maintained at 140°–200° C.;
compression zone: maintained at 150°–210° C.;
decompression zone: maintained at 170°–220° C.;
recompression zone: maintained at 170°–215° C.; and
proportioning zone: maintained at 170°–205° C.

11. The process of claim 10, in which the coextrusion head is maintained at a temperature lower than that of the decompression zone.

12. The process of claim 1, in which the thermoplastic polymer different from polyvinyl alcohol is molten and fed to the extrusion head at a temperature comprised between 120° and 200° C.

13. The process of claim 1, in which the temperature of the polyvinyl alcohol is at least equal to that of the other coextruded polymer or polymers, when it comes in contact therewith, the temperature difference being not higher than 70° C.

14. The process of claim 1, in which molding of the parison into a manufactured article occurs in the shortest possible time and not longer than 5 minutes.

15. The process of claim 1, in which the extruder is equipped, in proximity to the vent, with an exhauster.

16. The process of claim 1, in which the temperature of the polyvinyl alcohol is higher than the temperature of the other coextruded polymer or polymers, when it comes in contact therewith.

17. The process of claim 10, in which the temperature in the coextrusion head is lower than the temperature in the decompression zone and in the range from 160° C. to 200° C.

18. The process of claim 1, in which the coextruded thermoplastic polymer is a polyolefin.

19. The process of claim 18, in which the polyolefin is high density polyethylene, low density polyethylene, or polypropylene having a high isotactic index.

* * * * *